(12) United States Patent
Zhang et al.

(10) Patent No.: US 9,071,150 B2
(45) Date of Patent: Jun. 30, 2015

(54) VARIABLE FREQUENCY ITERATION MPPT FOR RESONANT POWER CONVERTERS

(71) Applicant: University of Central Florida Research Foundation, Inc., Orlando, FL (US)

(72) Inventors: Qian Zhang, Orlando, FL (US); Issa Bataresh, Orlando, FL (US); Lin Chen, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 14/272,110

(22) Filed: May 7, 2014

(65) Prior Publication Data

US 2014/0334190 A1 Nov. 13, 2014

Related U.S. Application Data

(60) Provisional application No. 61/820,295, filed on May 7, 2013.

(51) Int. Cl.
*H02M 3/335* (2006.01)

(52) U.S. Cl.
CPC ........ *H02M 3/33507* (2013.01); *Y02B 70/1433* (2013.01); *Y02B 70/1491* (2013.01)

(58) Field of Classification Search
CPC . H02M 3/33569; H02M 3/3376; H02M 1/12; H02M 7/537; H02M 7/5387; Y02B 70/1433; Y02B 70/1441
USPC ........... 363/16, 17, 21.02, 21.03, 39, 40, 131, 363/132
See application file for complete search history.

(56) References Cited

U.S. PATENT DOCUMENTS

| | | | | | |
|---|---|---|---|---|---|
| 4,404,472 | A | * | 9/1983 | Steigerwald | 307/46 |
| 5,625,539 | A | * | 4/1997 | Nakata et al. | 363/17 |
| 5,671,130 | A | * | 9/1997 | Kerkman et al. | 363/41 |
| 5,719,758 | A | * | 2/1998 | Nakata et al. | 363/98 |
| 5,912,813 | A | * | 6/1999 | Kerkman et al. | 363/98 |
| 5,923,158 | A | * | 7/1999 | Kurokami et al. | 323/299 |
| 6,014,497 | A | * | 1/2000 | Kerkman et al. | 388/811 |
| 6,111,767 | A | * | 8/2000 | Handleman | 363/95 |
| 6,320,769 | B2 | * | 11/2001 | Kurokami et al. | 363/56.03 |
| 6,590,793 | B1 | * | 7/2003 | Nagao et al. | 363/95 |
| 7,126,294 | B2 | * | 10/2006 | Minami et al. | 318/139 |
| 7,158,395 | B2 | * | 1/2007 | Deng et al. | 363/95 |
| 7,660,139 | B2 | * | 2/2010 | Garabandic | 363/98 |
| 8,018,748 | B2 | * | 9/2011 | Leonard | 363/95 |

(Continued)

*Primary Examiner* — Adolf Berhane
(74) *Attorney, Agent, or Firm* — Jetter & Associates, P.A.

(57) ABSTRACT

A method of maximum power point tracking (MPPT) uses an MPPT algorithm to determine a switching frequency for a resonant power converter, including initializing by setting an initial boundary frequency range that is divided into initial frequency sub-ranges bounded by initial frequencies including an initial center frequency and first and second initial bounding frequencies. A first iteration includes measuring initial powers at the initial frequencies to determine a maximum power initial frequency that is used to set a first reduced frequency search range centered or bounded by the maximum power initial frequency including at least a first additional bounding frequency. A second iteration includes calculating first and second center frequencies by averaging adjacent frequent values in the first reduced frequency search range and measuring second power values at the first and second center frequencies. The switching frequency is determined from measured power values including the second power values.

17 Claims, 5 Drawing Sheets

(56) References Cited

U.S. PATENT DOCUMENTS

| | | | |
|---|---|---|---|
| 8,050,062 B2 * | 11/2011 | Wagoner et al. | 363/49 |
| 8,184,460 B2 * | 5/2012 | O'Brien et al. | 363/97 |
| 8,284,574 B2 * | 10/2012 | Chapman et al. | 363/41 |
| 8,335,090 B2 * | 12/2012 | Huang et al. | 363/17 |
| 8,422,249 B2 * | 4/2013 | Cooper et al. | 363/17 |
| 8,750,005 B2 * | 6/2014 | Fujii et al. | 363/98 |
| 8,848,404 B2 * | 9/2014 | Tan et al. | 363/40 |
| 2013/0307339 A1 | 11/2013 | Subramanium et al. | |
| 2013/0307340 A1 | 11/2013 | Subramanium et al. | |
| 2014/0328102 A1 * | 11/2014 | Wang | 363/132 |

* cited by examiner $$Fr = \frac{1}{2\pi\sqrt{LrCr}} \qquad (1)$$

$$In > \varepsilon_1 \qquad (2)$$

THRESHOLD $\varepsilon_1$ IS USED TO DETERMINE IF THE INITIAL MPPT HAS BEEN FINISHED OR NOT. THE VALUE OF $\varepsilon_1$ IS BASED ON THE PV PANEL CURRENT MEASURED AT START POINT $2F_r$, WHICH IS USUALLY VERY SMALL. IF (2) IS 'FALSE', LLC CONVERTER HAS NOT STARTED YET, THUS BEGINS THE INITIALIZATION IMMEDIATELY.

$$\begin{cases} F(1) = F(4) \\ F(2) = F(5) \\ F(3) = F(3) \end{cases} \qquad (3)$$

$$\begin{cases} F(1) = F(3) \\ F(2) = F(2) \\ F(3) = F(5) \end{cases} \qquad (4)$$

$$\begin{cases} F(1) = F(1) \\ F(2) = F(3) \\ F(3) = F(4) \end{cases} \qquad (5)$$

$$\begin{cases} F(4) = \dfrac{F(3) + F(1)}{2} \\ F(5) = \dfrac{F(2) + F(3)}{2} \end{cases} \qquad (6)$$

$$Pmax(P3,P4,P5) - Pmin(P3,P4,P5) < \varepsilon_2 \qquad (7)$$

THE THRESHOLD $\varepsilon_2$ DETERMINES WHERE THE MPP HAS BEEN REACHED OR NOT. THE VALUE IS BASED ON THE CURRENT AND VOLTAGE SENSING ACCURACY. IN THIS EXAMPLE IT IS SELECTED TO BE 0.5% $P_n$.

$$\Delta Iin > \sigma \qquad (8)$$

THRESHOLD $\sigma$ IS USED TO DETERMINE IF THE IRRADIATION HAS BEEN CHANGED. WHEN THE IRRADIATION CONDITION CHANGED, TH PV OUTPUT VOLTAGE WOULD CHANGE SLOWLY DUE TO THE CAPACITOR LIKE $G_{in}$, LEADING THE CURRENT TO INCREASE (OR DECREASE) SIGNIFICANTLY BEYOND THE LIMIT $\sigma$. THE VALUE IS ALSO BASED ON THE CURRENT SENSING ACCURACY.

FIG. 5

VARIABLE FREQUENCY ITERATION MPPT FOR RESONANT POWER CONVERTERS

CROSS REFERENCE TO RELATED APPLICATIONS

This application claims the benefit of Provisional Application Ser. No. 61/820,295 entitled "MAXIMUM POWER POINT TRACKING FOR RESONANT INVERTERS BASED ON ITERATION TECHNIQUE", filed May 7, 2013, which is herein incorporated by reference in its entirety.

U.S. GOVERNMENT RIGHTS

This invention was made with U.S. Government support under Department of Energy (DOE) Award Number: DE-EE0003176. The U.S. Government has certain rights in this invention.

FIELD

Disclosed embodiments relate to maximum power point tracking (MPPT) for resonant power converters.

BACKGROUND

MPPT is a technique that can be used to harvest photovoltaic (PV) power under various environments that grid-tie inverters, solar battery chargers and similar devices to obtain the maximum possible electrical power, typically being power from an array of PV panels. Perturb and observe (P&O) algorithms are the most widely used for MPPT due to their effectiveness and simplicity in application. In P&O a processor-based controller adjusts the output voltage by a small amount (perturbation) from the PV array and then measures (observes) the resulting power. If the power increases due to the perturbation, further adjustments in that same direction are tried until the power no longer increases.

However, conventional P&O with fixed perturbation increments is difficult to generally balance the tracking speed and oscillation requirements. Thus, adaptive P&O techniques are sometimes used to solve these problems. Known adaptive P&O techniques are based on duty cycle modulation for conventional pulse width modulation (PWM) power converters.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include Maximum Power Point Tracking (MPPT) algorithms which adjust the switching frequency of a resonant power converter coupled to receive power from a variable output power source directly with various sized frequency steps ("variable frequency iteration") which overcomes the disadvantages of conventional P&O MPPT. Moreover, the variable frequency iteration MPPT method disclosed herein is suitable for resonant power converters with different power frequency curves which may confuse conventional MPPT algorithms.

An embodiment is also provided which accelerates the tracking speed to obtain the selected switching frequency. An LLC resonant converter prototype was built to carry out the disclosed variable MPPT and evaluated. Experimental results are provided herein that verify the effectiveness of disclosed variable frequency iteration MPPT algorithms to increase the output power generated by one or more photovoltaic (PV) panel(s), which also apply to other power generation systems including those based on wind turbine(s) and tide turbine(s).

BRIEF DESCRIPTION OF THE DRAWINGS

FIG. 3 is an example double stage DC/AC inverter system having a series LLC resonant circuit that disclosed variable frequency iteration MPPT may be practiced with.

FIG. 4 is an example single stage DC/DC converter system having a LCLC resonant circuit that disclosed variable frequency iteration MPPT may be practiced with.

FIG. 5 provides equations and other information for implementing disclosed variable frequency iteration MPPT for a series LLC resonant circuit referenced in the Detailed Description below.

DETAILED DESCRIPTION

Figure 1A:
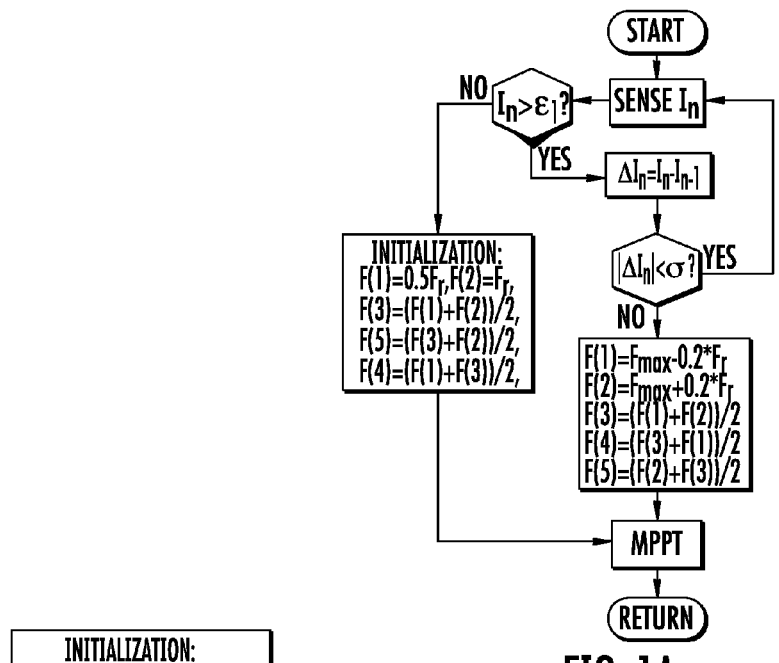
FIGS. 1A and 1B provide flowcharts for an example variable frequency iteration MPPT technique for determining the switching frequency for a DC/AC inverter having an LLC resonant circuit, where the control parameter is the switching frequency (F) for application to the control inputs of the power semiconductor switches in the DC-DC converter section of a resonant power converter, according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Disclosed embodiments recognize compared with pulse width modulation (PWM) power converters, resonant power converters which include resonant circuits can be used with comparatively larger input voltages. There are a variety of resonant converter topologies which all operate in essentially the same way: A square pulse of voltage or current generated by the power switches of a DC-DC converter section is applied to a resonant circuit. Energy circulates in the resonant circuit, and some or all of the energy is then tapped off to supply the output. Resonant power converters regulate their output voltage by changing the frequency of the driving voltage such that the impedance of the reactive elements in the resonant circuit changes. The input voltage to the resonant circuit is split between this impedance and the load.

In a resonant power converter, the power converter is tuned or components added to establish an effective LC (resonant) circuit that defines the time scale for the rise and fall of energy through the windings of the transformer. Disclosed embodiments provide variable frequency iteration MPPT algorithms that take advantage of this energy rise and fall (resonance), where one or more of the semiconductor power switches in the power converter are switched open and closed at zero (or essentially zero) current through the switch, zero (or essentially zero) voltage across the switch, or both.

As used herein, the term "semiconductor power switches" includes field effect transistors (FETs), bipolar junction transistors (BJTs) and Insulated Gate Bipolar Transistor (IGBTs). FETs and IGBTs have gates as their control input, while BJTs have a base as their control input. Thus, although the specific semiconductor switches shown herein are generally MOSFET switches, it is understood the semiconductor power switches can generally be any type of semiconductor power switch.

By selecting a switching frequency that switches the semiconductor power switch(es) at either zero-voltage and/or zero-current, switching losses that result from the dissipation of energy during the simultaneous occurrence of a voltage across and current through the switch are reduced. At the same time, much of the noise produced by the switch(es) can be eliminated.

Resonant power converters are recognized by disclosed embodiments to be particularly suitable for application to DC/AC micro-inverters (DC/AC inverter systems) due to the following advantages:

1. Reduced switching losses due to soft-switching operation in all the semiconductor components.
2. Reduced size due to high switching frequency capability of the resonant nature of the circuit.
3. No adverse effect of voltage stresses on devices due to the leakage inductance since it is part of the resonant circuit.

These above advantages generally apply for all resonant converters, including DC-DC converters. However, operation of resonant power converters is complicated under frequency modulation with both input voltage variation and load variation. Disclosed center points variable frequency iteration MPPT adjusts the switching frequency of the resonant power converter directly with various frequency steps, which is faster, simpler and more reliable as compared to the known MPPT methods disclosed above in the background. A disclosed variable frequency iteration MPPT algorithm is described as below with an example resonant power converter including a series LLC resonant circuit (such as shown in the DC/AC inverter system shown in FIG. 3 described below).

Figure 1B:
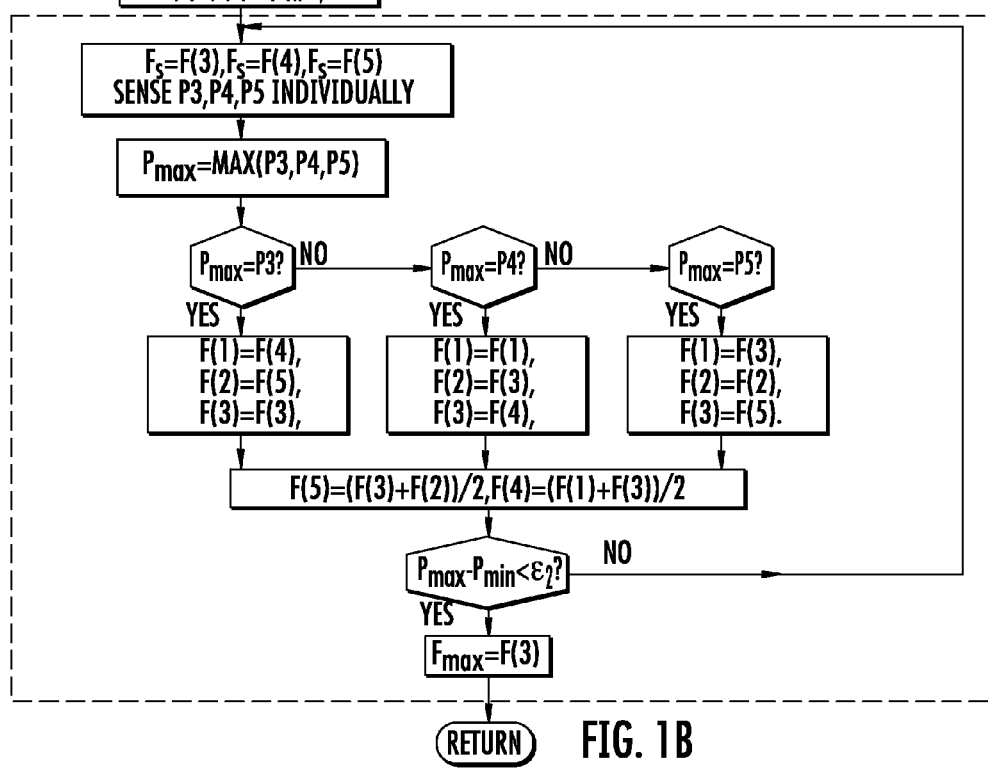
Figure 1C:
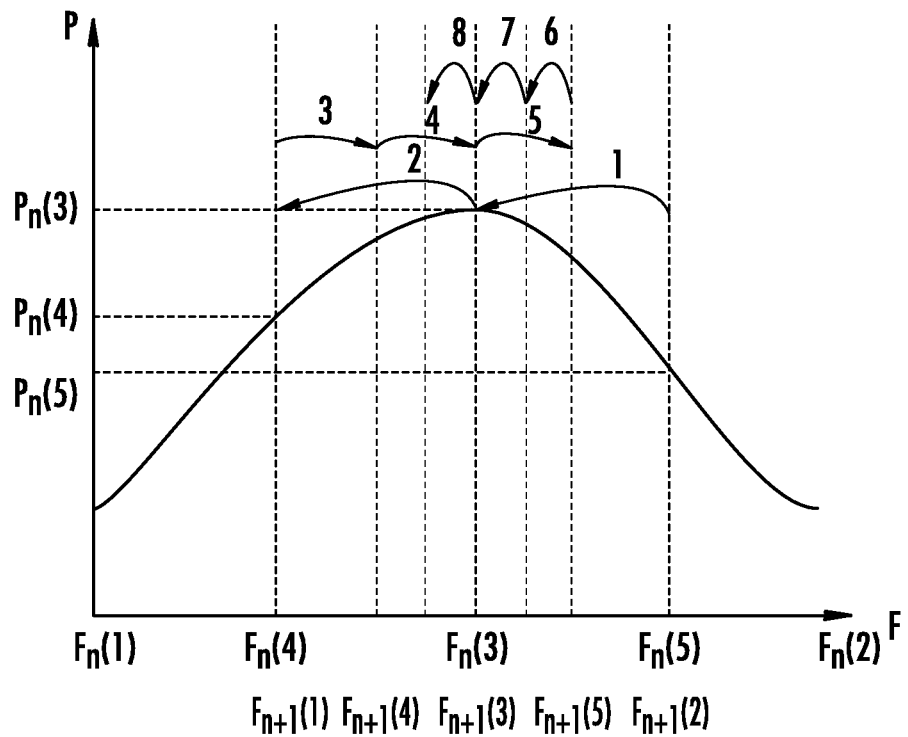
FIG. 1C shows the whole frequency region shown from F(1) to F(2) first divided into 4 example parts, according to an example embodiment.

A flowchart for an example disclosed variable frequency iteration MPPT technique is illustrated in FIGS. 1A and 1B for a three-phase DC/AC inverter having a resonant power converter including a series LLC resonant circuit. As noted above, although generally described for DC/AC inverters, disclosed embodiments generally apply to all resonant circuits, since disclosed MPPT can be applied for all resonant converters. The control parameter is the switching frequency (F) applied by control input driver(s) that are controlled by controllers for application to the control inputs of the power semiconductor switches shown as gates of the power Metal Oxide Semiconductor Field Effect Transistor (MOSFET) devices (shown as switches S1, S2, S3 and S4 in FIGS. 3 and 4 described below in the DC-DC converter section of the resonant power converter. As shown in FIG. 1C, in an initialization step the whole frequency region shown from F(1) to F(2) is divided into a plurality of parts shown being divided into 4 parts: part 1: F(1) to F(4), part 2: F(4) to F(3), part 3: F(3) to F(5), part 4: F(5) to F(2).

Considering the inductive zone of the LLC converter, the initial boundary frequency range can be set around the resonant frequency (Fr) of the resonant circuit, such as from F(1)=0.5Fr, to F(2)=2Fr, where Fr can be calculated by equation (1) shown in FIG. 5 which shows example implementation details for a disclosed frequency iteration MPPT described below for a series LLC resonant converter. The inductive zone is a frequency zone for a resonant converter, where when the resonant converter is working therein, the resonant tank appears as an inductive load to the bridge so that soft switching can be achieved. Equation (1) can also be for LCLC resonant circuits used since the inductive zone can also be described based on calculation including that frequency, but for an LCLC resonant circuit the calculation of inductive zone is significantly more complicated as compared with an LLC converter.

As illustrated in FIG. 1A, equation (2) in FIG. 5 which includes a predetermined threshold input current value $\epsilon_1$ that is compared to In (the current from the power source) is used to determine whether the LLC converter has started operation yet. $\epsilon_1$ depends on the practical elements in the PV system, for example what type of PV panel is being used. The description in FIG. 5 provides a way to calculate $\epsilon_1$ since the MPPT starts from boundary frequency 2Fr. If the output power stays the same as measured at 2Fr, that indicates MPPT has not started yet.

The term In shown in FIG. 5 is the n time's Iout, since it is to be compared with In−1 (which means the n−1 time's Iout). In this case the output voltage is fixed so by comparing the output current, the output power can be compared as well.

As illustrated in FIG. 1B, in a first iteration, powers P3, P4 and P5 (output powers found by measuring the Vo×Io shown in FIGS. 3 and 4 that is input to the DC/AC inverter in FIG. 3 and to the Rload in FIG. 4) are measured specifically corresponding to frequencies F(3), F(4) and F(5), respectively. If the maximum power is P3 (i.e. P3>P4 and P5), the search range can be reduced by frequency re-assignment (iteration) according to equation (3) in FIG. 5 which centers the reduced search range on F(3) (reduced search range (F(4) to F(5) shown in FIG. 1C). If the maximum power is P5 (i.e. P5>P3 and P4), the searching range can be reduced by frequency reassignment according to equation (4) in FIG. 5 which centers the reduced search range on F(5) (reduced search range (F(3) to F(2) shown in FIG. 1C). If the maximum power is P4 (i.e. P4>P3 and P5), the searching range can be reduced by frequency reassignment according to equation (5) in FIG. 5 which centers the reduced search range on F(4) (reduced search range (F(1) to F(3) shown in FIG. 1C).

The next frequency iteration is where dividing center frequency points are calculated by equation (6) in FIG. 5 (shown by example divided by 2). The frequency interval is again divided into 4 example parts again for the next power comparisons. Frequency iterations can be continued until the boundary frequencies are close enough to reach a predetermined MPP criterion reflected in comparison of the power difference between maximum power and minimum power at F(3), F(4) and F(5), shown compared to a threshold power shown as $\epsilon_2$ according to equation (7) in FIG. 5. After the MPP based on compression to the $\epsilon_2$ used is achieved, the MPPT algorithm may be stopped, operation of the power source (e.g., a PV source) with the resonant inverter initiated using the maximum power switching frequency determined from the boundary frequencies close enough to reach the predetermined MPP criterion, and the PV current $I_{in}$ is monitored.

If the condition shown in equation (8) as $\Delta Iin > \sigma$ where $\sigma$ is a predetermined current threshold used to determine if the irradiation has changed in FIG. 5 is observed to be "true" and in the case of a PV source the irradiation of the PV panel(s) has thus significantly changed (or wind for a wind turbine, or tides for a tidal turbine), the MPP may move and a new tracking progress sequence may be initiated again. Although the environmental temperature may change Vmp (the voltage at the peak power point) in a large scale, because of the generally relatively high thermal inertia of a PV array, the progress cannot generally be completed in a few seconds. Moreover irradiance cannot generally change Vmp in large scale, thus the new MPPT does not generally need to restart from the initial interval again. As illustrated in FIG. 1A, searching between [Fmax−0.2Fr] and [Fmax+0.2Fr] is enough, where Fmax refers to the last maximum power frequency. This limited frequency interval speeds up the MPPT progress.

Improved center points variable frequency iteration MPPT control is thus provided. To accelerate the disclosed MPPT frequency tracking speed, additional criterion can be included to shrink the possible maximum power existed intervals, which is referred to herein as streamlined center points iteration MPPT control. The streamlined center points iteration method is illustrated in FIG. 2A where the whole frequency region shown from F(1) to F(2) is first divided into a plurality of parts shown as 4 example parts, and FIG. 2B provides a flow chart for the streamlined center points iteration method.

Figure 2A:
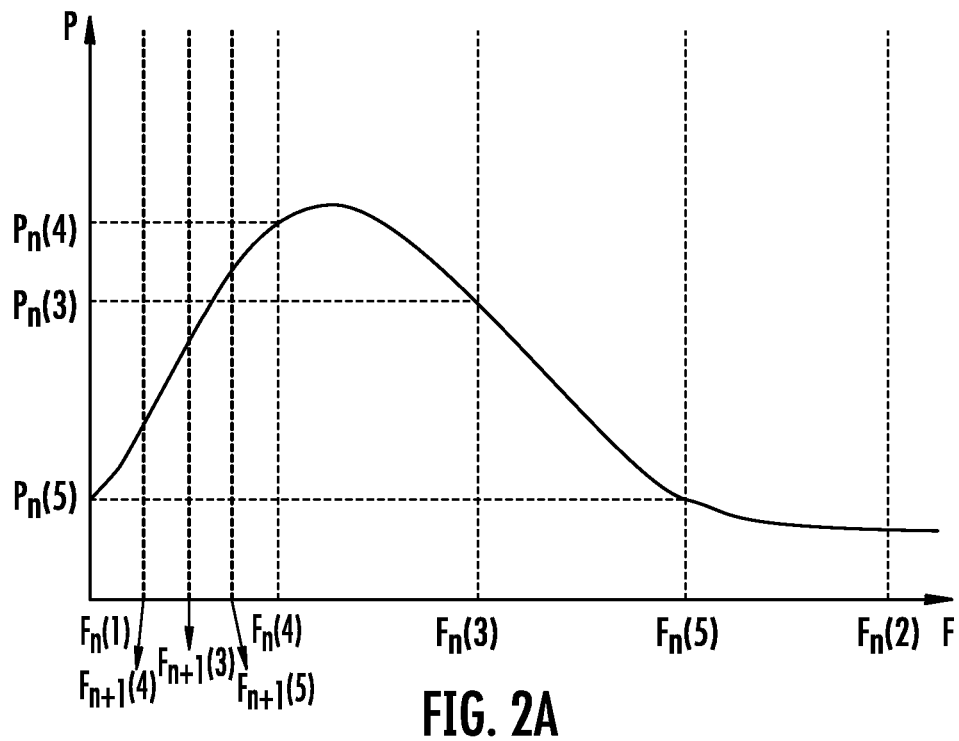
FIG. 2A illustrates an example center points variable frequency iteration method where the whole frequency region shown from F(1) to F(2) is first divided into a plurality of parts according to an example embodiment.
Figure 2B:
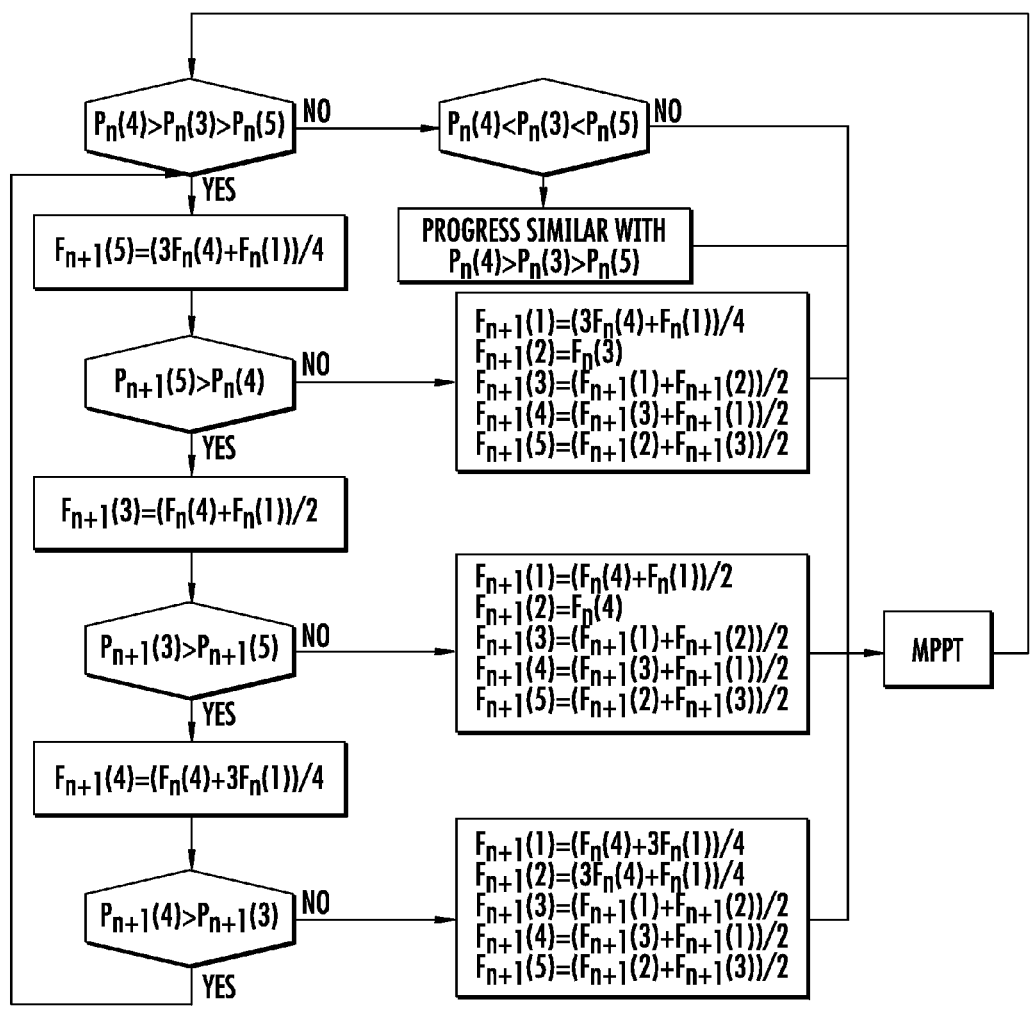
FIG. 2B is a flow chart for the example center points variable frequency iteration method according to an example embodiment.

The logic of the streamlined center points MPPT can be expressed as follows: if an increasing or decreasing power trend is observed (for example in FIG. 2A, Pn(4)>Pn(3)>Pn(5)), it is assumed that this trend (to frequencies lower than Fn(4)) will continue for the next power testing point (Fn+1(5)), to allow the Fn+1 (second iteration) test frequencies to all be between Fn(1) and Fn(4) as shown in FIG. 2A. If the measured power verifies this assumption (i.e. Pn+1(5)>Pn(4)), it is assumed that the trend would be kept for next power testing point (Fn+1(4)) as well. Otherwise, there can be a return to perform the center point MPPT described relative to FIGS. 1A and 1B in local range (between Fn+1(5) and Fn(3)). Because the frequency range can shrink based on the test results, the streamlined center points iteration MPPT accelerates the tracking speed to the switching frequency which provides a maximum power output.

The streamlined center points MPPT can increase complexity somewhat compared to conventional MPPT, however it approaches the MPP faster. With the streamlined center points frequency iteration MPPT applied, the longest tracking time takes place when the MPP is at the middle frequency of initial frequency boundaries. As no trend could be observed in the process, the streamlined center points MPPT would default to the center points frequency iteration MPPT described relative to FIGS. 1A and 1B in this case.

Figure 3:
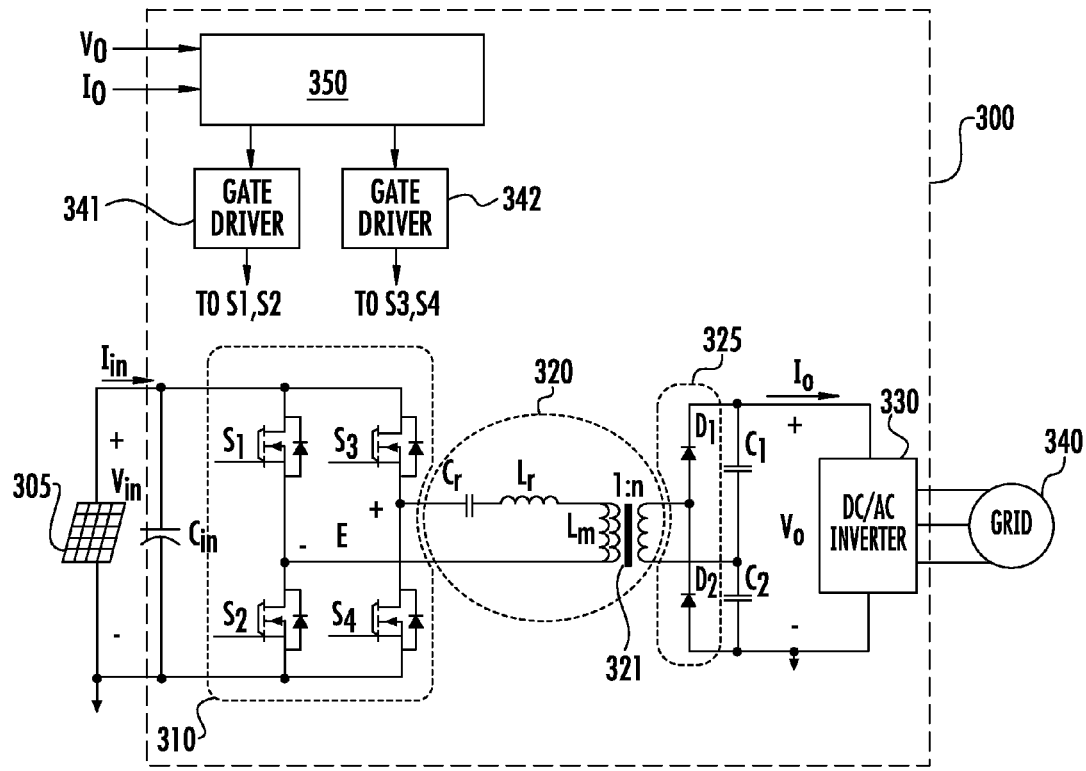

FIG. 3 is an example double stage 3-phase DC/AC inverter system 300 having a series LLC resonant circuit 320 including a controller 350 that disclosed variable frequency iteration MPPT may be practiced with. DC/AC inverter system 300 receives power (shown as Iin) from a power source 305 shown as a PV panel. DC/AC inverter system 300 includes a DC-DC converter section 310 including MOSFET switches S1, S2, S3 and S4 that collectively develop a square wave voltage shown as E in FIG. 3 across the series LLC resonant circuit 320, a diode rectifier section 325 to convert from AC to DC following transformer 321, and a DC/AC inverter section 330 which supplies a three-phase output to a three-phase power grid 340. The MOSFET switches S1 to S4 in the DC-DC converter section 310 are shown including internal diodes connected in parallel to the source-drain path referred to in the art as "body diodes".

Controller 350 receives output power data shown by the receipt of Io and Vo (DC output power=Io*Vo), and is configured and coupled to set the switching frequency of the DC/AC inverter system 300 by applying control signals to the control input driver block 341 shown as "gate driver" which drives the gates of S1 and S2 in the DC-DC converter section 310 and to the control input driver block 342 also shown as "gate driver" which drives the gates of the S3 and S4 in the DC-DC converter section 310. As known in the art, each control input driver block shown can include a separate high side driver and low side driver.

Figure 4:
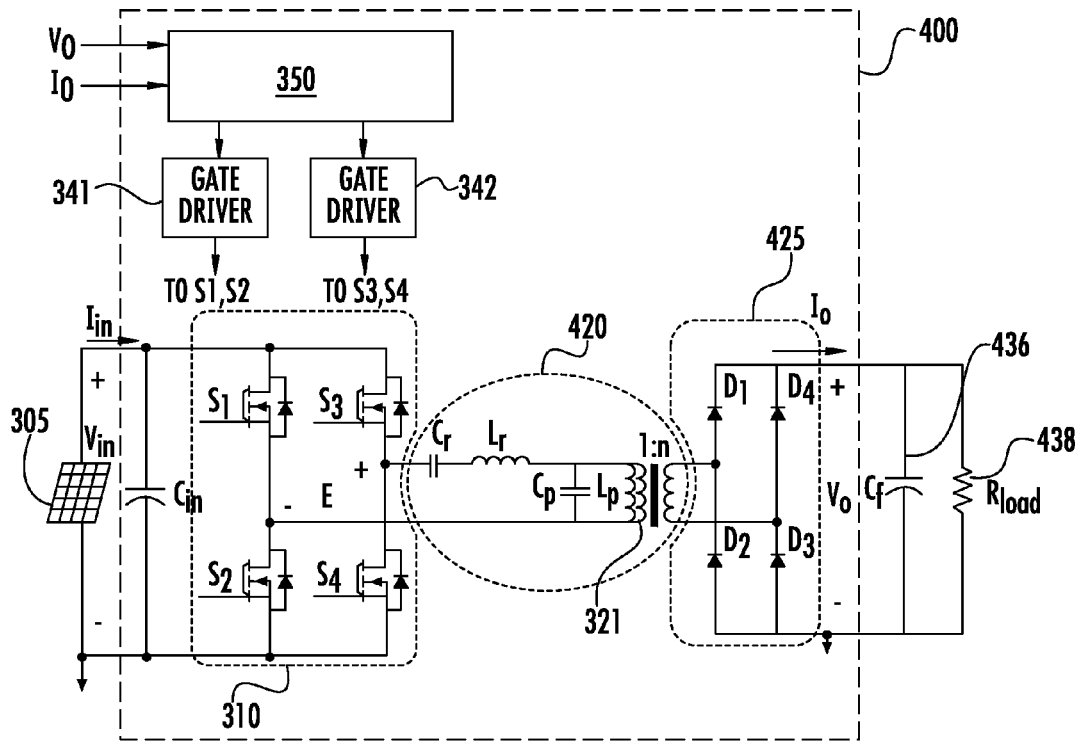

FIG. 4 is an example single stage DC/DC power converter system 400 having a DC-DC converter section 310 coupled to an LCLC resonant circuit 420 that disclosed variable frequency iteration MPPT may be practiced with. The LCLC resonant circuit 420 is coupled to a diode rectifier section 425 to convert from AC to DC following transformer 321. The diode rectifier section 425 is shown coupled to a load resistor (Rload) 438 across a capacitor 436 shown as Cf. Disclosed frequency iteration MPPT may be practiced with other resonant power converter topologies such as parallel resonant converters (PRCs), series-parallel resonant converter (SPRCs or LCCs).

Advantages or benefits of disclosed variable frequency iteration MPPT include the direct adjustment of frequency for resonant power converters while other advantages include resonant power converters being able to perform soft switching for a large range of input voltages. Variable perturb values during tracking progress and lack of oscillation under steady-state operation are also provided. Simple calculation of frequency is also provided, as well as relatively easy application, and fast tracking speed. Independence from initial environment parameters is moreover provided. Disclosed variable frequency iteration MPPT can also inherently deal with various power curves including a part of multi-peaks power curves. Multi-peak power curves refer to PV power curves which have multi-peaks instead of a single peak due to shadow or dust. Since disclosed MPPT tracking starts from the whole possible operation range and narrows down the frequency searching range from both directions (both a high and low boundary frequencies), thus compared with conventional P&O MPPTs which always track from a single direction (from high to low or from low to high), disclosed variable frequency iteration MPPT has a better ability to deal with the multi-peak power curves.

Regarding uses for disclosed variable frequency iteration MPPT, frequency control resonant converters with inherently soft switching are helpful for the application of micro-inverters. However, the complicated nonlinear voltage gain changes with varying frequency and load. No direct frequency modulated MPPT could be provided on them. With disclosed embodiments, MPPT is instead arrived at by directly perturbing the frequency. Disclosed embodiments can easily realize MPPT on frequency modulated converters, which allows resonant power converters to be more broadly used in micro-inverters.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A method of maximum power point tracking (MPPT), comprising:
   providing a processor that is coupled through at least one control input driver to control a switching frequency of a resonant power converter including a resonant circuit including a plurality of power semiconductor switches which receives power from a variable power source;
   wherein said processor is programmed to implement a MPPT algorithm that includes:
   initializing by setting an initial boundary frequency range, dividing said initial boundary frequency range into a plurality of initial frequency sub-ranges bounded by a plurality of initial frequencies including an initial center frequency and first and second initial bounding frequency, that are all within said initial boundary frequency range;
   a first iteration including measuring initial power values at said plurality of initial frequencies to determine which frequency provides a maximum power (maximum power initial frequency), and using said maximum power initial frequency to set a first reduced frequency search range centered or bounded by said maximum power initial frequency including at least a first additional bounding frequency, said first reduced frequency search range narrower as compared to a range of said plurality of initial frequencies,
   at least a second iteration, said second iteration including calculating first and second center frequencies by averaging adjacent frequent values in said first reduced frequency search range and measuring second power values at said first and said second center frequencies, and
   determining said switching frequency from measured power values including said second power values.

2. The method of claim 1, further comprising calculating a power difference between a maximum power from said second power values and a power value at said initial center frequency, and a minimum power from said second power values and said power value at said initial center frequency, and comparing said power difference to a predetermined power threshold, and
   performing a third iteration analogous to said second iteration if said power difference is >said predetermined power threshold before proceeding to said determining said switching frequency.

3. The method of claim 1, further comprising applying control input drive signals at said switching frequency to control inputs of said power semiconductor switches to run said resonant power converter at said switching frequency.

4. The method of claim 1, wherein a resonant frequency of said resonant circuit is used to determine said initial boundary frequency range.

5. The method of claim 1, wherein said variable power source comprises a plurality of photovoltaic (PV) panels.

6. The method of claim 1, wherein if an increasing or decreasing power trend is observed for said initial power values, using said power trend to select said first additional bounding frequency.

7. The method of claim 1, wherein said resonant circuit comprises a series LLC resonant circuit.

8. The method of claim 1, wherein said resonant circuit comprises an LCLC resonant circuit.

9. The method of claim 1, wherein said power semiconductor switches comprise Metal Oxide Semiconductor Field Effect Transistors (MOSFETs).

10. A resonant power converter, comprising:
    a DC/DC converter section including a plurality of power semiconductor switches having an input for receiving electrical power from a power source,
    a resonant circuit having an input coupled to an output of said DC/DC converter section;
    a processor coupled to control input drivers which are coupled to control inputs of said power semiconductor switches,
    wherein said processor is programmed to implement a MPPT algorithm that includes:
    initializing by setting an initial boundary frequency range, dividing said initial boundary frequency range into a plurality of initial frequency sub-ranges bounded by a plurality of initial frequencies including an initial center frequency and first and second initial bounding frequency that are all within said initial boundary frequency range;
    a first iteration including measuring initial power values at said plurality of initial frequencies to determine which frequency provides a maximum power (maximum power initial frequency), and using said maximum power initial frequency to set a first reduced frequency search range centered or bounded by said maximum power initial frequency including at least a first additional bounding frequency, said first reduced frequency search range narrower as compared to a range of said plurality of initial frequencies,
    at least a second iteration, said second iteration including calculating first and second center frequencies by averaging adjacent frequent values in said first reduced frequency search range and measuring second power values at said first and said second center frequencies, and
    determining a switching frequency for said resonant power converter from measured power values including said second power values.

11. The resonant power converter of claim 10, wherein said resonant power converter is a single stage DC/DC converter, and said resonant circuit is an LCLC resonant circuit.

12. The resonant power converter of claim 10, wherein said resonant power converter is a double stage DC/AC inverter further comprising a DC/AC inverter coupled to an output of said DC/DC converter section, and wherein said resonant circuit is an LLC resonant circuit.

13. The resonant power converter of claim 10, wherein a resonant frequency of said resonant circuit is within said initial boundary frequency range.

14. The resonant power converter of claim 10, if an increasing or decreasing power trend is observed for said initial power values, using said power trend to select said first additional bounding frequency.

15. The resonant power converter of claim 10, wherein said resonant circuit comprises a series LLC resonant circuit.

16. The resonant power converter of claim 10, wherein said resonant circuit comprises an LCLC resonant circuit.

17. The resonant power converter of claim 10, wherein said power semiconductor switches comprise Metal Oxide Semiconductor Field Effect Transistors (MOSFETs).

* * * * *